(12) United States Patent
Zhou

(10) Patent No.: US 9,310,811 B2
(45) Date of Patent: Apr. 12, 2016

(54) SELF-ALIGNING VALVE PORT

(71) Applicant: EMERSON PROCESS MANAGEMENT REGULATOR TECHNOLOGIES, INC., McKinney, TX (US)

(72) Inventor: Biao Zhou, Chengdu (CN)

(73) Assignee: EMERSON PROCESS MANAGEMENT REGULATOR TECHNOLOGIES, INC., McKinney, TX (US)

(*) Notice: Subject to any disclaimer, the term of this patent is extended or adjusted under 35 U.S.C. 154(b) by 307 days.

(21) Appl. No.: 13/794,174

(22) Filed: Mar. 11, 2013

(65) Prior Publication Data
US 2014/0083513 A1 Mar. 27, 2014

(30) Foreign Application Priority Data

Sep. 21, 2012 (CN) .......................... 2012 1 0353597

(51) Int. Cl.
*F16K 1/42* (2006.01)
*F16K 31/165* (2006.01)
*G05D 16/16* (2006.01)
*G05D 16/06* (2006.01)

(52) U.S. Cl.
CPC ................ *G05D 16/06* (2013.01); *F16K 1/427* (2013.01); *F16K 31/165* (2013.01); *G05D 16/0688* (2013.01); *Y10T 137/0324* (2015.04); *Y10T 137/7793* (2015.04)

(58) Field of Classification Search
CPC .. G05D 16/16; G05D 16/0688; F16K 31/165; F16K 1/427; Y10T 137/7793; Y10T 137/0324
USPC .................... 251/359–360, 362–363, 58, 333
See application file for complete search history.

(56) References Cited

U.S. PATENT DOCUMENTS

| | | | | |
|---|---|---|---|---|
| 1,540,380 A * | 6/1925 | Wilson | .......................... | 251/363 |
| 2,060,748 A * | 11/1936 | Hardy et al. | ................... | 251/332 |
| 2,192,339 A * | 3/1940 | Wilson | .......................... | 251/334 |
| 2,280,390 A * | 4/1942 | Ensign | ........................ | 137/484.4 |
| 2,315,370 A * | 3/1943 | Hughes | ........................ | 137/484.4 |

(Continued)

FOREIGN PATENT DOCUMENTS

GB     2 277 976 A     11/1994

OTHER PUBLICATIONS

International Search Report and Written Opinion for Application No. PCT/US2013/060650, dated Nov. 26, 2013.

(Continued)

*Primary Examiner* — Mary McManmon
*Assistant Examiner* — David Colon Morales
(74) *Attorney, Agent, or Firm* — Marshall, Gerstein & Borun LLP

(57) ABSTRACT

A regulator comprises a regulator valve and an actuator. The actuator is coupled to the regulator valve and comprises a control element for controlling the flow of fluid through the regulator valve. The regulator valve is equipped with a self-aligning valve port that includes a retaining portion, a biased portion disposed within the retaining portion, and a biasing member disposed between the retaining portion and the biased portion. The self-aligning valve port advantageously automatically adjusts to achieve sealed engagement with the control element of the actuator, thereby improving regulator performance.

14 Claims, 5 Drawing Sheets

(56) References Cited

U.S. PATENT DOCUMENTS

| | | | | |
|---|---|---|---|---|
| 2,597,474 | A | * | 5/1952 | Griffith .................... 251/364 |
| 2,619,983 | A | * | 12/1952 | Roberts .................... 137/484.8 |
| 2,717,001 | A | * | 9/1955 | Perrault .................... 137/514 |
| 2,729,236 | A | * | 1/1956 | Valince .................... 137/505.46 |
| 2,735,047 | A | * | 2/1956 | Garner .................... 335/245 |
| 2,979,067 | A | * | 4/1961 | Kern, Jr. et al. .......... 137/15.19 |
| 3,271,003 | A | | 9/1966 | Floessel et al. |
| 3,362,680 | A | * | 1/1968 | Weiss .................... 251/360 |
| 3,430,646 | A | * | 3/1969 | Vick .................... 137/375 |
| 3,613,725 | A | * | 10/1971 | Hughes .................... 137/613 |
| 3,746,305 | A | * | 7/1973 | Zakka .................... 251/360 |
| 3,754,570 | A | * | 8/1973 | Hughes .................... 137/613 |
| 3,857,408 | A | * | 12/1974 | Rhodes et al. .............. 137/514 |
| 3,892,255 | A | * | 7/1975 | Johnson .................... 137/116.5 |
| 3,892,384 | A | * | 7/1975 | Myers .................... 251/282 |
| 4,040,442 | A | * | 8/1977 | Alexandre .............. 137/543.17 |
| 4,118,008 | A | * | 10/1978 | Myers .................... 251/298 |
| 4,506,690 | A | * | 3/1985 | Mitchell .................... 137/1 |
| 4,556,083 | A | * | 12/1985 | Schleiter, Sr. .................. 137/514 |
| 5,064,169 | A | * | 11/1991 | Alberts et al. ................ 251/334 |
| 5,139,042 | A | * | 8/1992 | Calhoun .................... 137/15.17 |
| 5,188,150 | A | * | 2/1993 | Esplin .................... 137/630.14 |
| 5,402,820 | A | * | 4/1995 | Duffy et al. .............. 137/505.36 |
| 5,483,991 | A | * | 1/1996 | D'Agostino et al. ......... 137/514 |
| 5,697,398 | A | * | 12/1997 | Gidney et al. .............. 137/484.8 |
| 6,997,440 | B2 | * | 2/2006 | Tutt et al. .................... 251/331 |
| 7,954,788 | B2 | * | 6/2011 | Davies et al. ................ 251/365 |
| 2004/0187930 | A1 | * | 9/2004 | Hawkins et al. ......... 137/505.47 |
| 2008/0257423 | A1 | * | 10/2008 | Quijano .................... 137/489 |
| 2008/0258098 | A1 | | 10/2008 | Hawkins et al. |
| 2009/0065726 | A1 | * | 3/2009 | Hostetter et al. ......... 251/315.01 |
| 2009/0127488 | A1 | * | 5/2009 | McCarty et al. .............. 251/332 |
| 2010/0071786 | A1 | * | 3/2010 | Hawkins et al. .............. 137/485 |
| 2010/0133460 | A1 | * | 6/2010 | Durant et al. ................ 251/359 |
| 2010/0269925 | A1 | * | 10/2010 | Roper et al. .............. 137/505.37 |

OTHER PUBLICATIONS

International Preliminary Report on Patentability from International Application No. PCT/US2013/060650 dated Mar. 24, 2015.

* cited by examiner

SELF-ALIGNING VALVE PORT

FIELD OF THE DISCLOSURE

The present disclosure relates to gas regulators, and more particularly, to a self-aligning valve port for a gas regulator.

BACKGROUND OF THE DISCLOSURE

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

FIG. 1 depicts one conventional gas regulator 10. The regulator 10 generally comprises an actuator 12 and a regulator valve 14. The regulator valve 14 defines an inlet 16 for receiving gas from a gas distribution system, for example, and an outlet 18 for delivering gas to an end-user facility such as a factory, a restaurant, an apartment building, etc. having one or more appliances, for example. Additionally, the regulator valve 14 includes a valve port 36 disposed between the inlet and the outlet. Gas must pass through the valve port 36 to travel between the inlet 16 and the outlet 18 of the regulator valve 14.

The actuator 12 is coupled to the regulator valve 14 to ensure that the pressure at the outlet 18 of the regulator valve 14, i.e., the outlet pressure, is in accordance with a desired outlet or control pressure. The actuator 12 is therefore in fluid communication with the regulator valve 14 via a valve mouth 34 and an actuator mouth 20. The actuator 12 includes a control assembly 22 for regulating the outlet pressure of the regulator valve 14 based on sensed outlet pressure. Specifically, the control assembly 22 includes a diaphragm supporting plate 19, a diaphragm 24, a piston 32, and a control arm 26 having a valve disc 28. The valve disc 28 includes a generally cylindrical body 25 and a sealing insert 29 fixed to the body 25. The diaphragm 24 senses the outlet pressure of the regulator valve 14 and provides a response to move the valve disc 28 to open and close the regulator valve 14. The control assembly 22 further includes a control spring 30 in engagement with a top-side of the control assembly 22 to offset the outlet pressure sensed by the diaphragm 24. Accordingly, the desired outlet pressure, which may also be referred to as the control pressure, is set by the selection of the control spring 30.

The diaphragm 24 is operably coupled to the control arm 26, and therefore, the valve disc 28, via the piston 32, and controls the opening of the regulator valve 14 based on the sensed outlet pressure. For example, when an end user operates an appliance, such as a furnace, for example, that places a demand on the gas distribution system downstream of the regulator 10, thereby decreasing the outlet pressure. Accordingly, the diaphragm 24 senses this decreased outlet pressure. This allows the control spring 30 to expand and move the piston 32 and the right-side of the control arm 26 downward, relative to the orientation of FIG. 1. This displacement of the control arm 26 moves the valve disc 28 away from the valve port 36 to open the regulator valve 14, thereby increasing the outlet flow to meet the increased demand from the appliance and increasing the outlet pressure back to the control pressure. So configured, the appliance may draw gas through the valve port 36 and through the outlet 18 of the regulator valve 14.

The control assembly 22 of the conventional regulator 10 further functions as a relief valve. Specifically, the control assembly 22 also includes a relief spring 40 and a release valve 42. The diaphragm 24 includes an opening 44 through a central portion thereof and the piston 32 includes a sealing cup 38. The relief spring 40 is disposed between the piston 32 and the diaphragm 24 to bias the diaphragm 24 against the sealing cup 38 to close the opening 44, during normal operation. Upon the occurrence of a failure such as a break in the control arm 26, the control assembly 22 is no longer in direct control of the valve disc 28 and inlet flow will move the valve disc 28 into an extreme open position. This allows a maximum amount of gas to flow into the actuator 12. Thus, as the gas fills the actuator 12, pressure builds against the diaphragm 24 forcing the diaphragm 24 away from the sealing cup 38, thereby exposing the opening 44. The gas therefore flows through the opening 44 in the diaphragm 24 and toward the release valve 42. The release valve 42 includes a valve plug 46 and a release spring 54 biasing the valve plug 46 into a closed position, as depicted in FIG. 1. Upon the pressure within the actuator 12 and adjacent the release valve 42 reaching a predetermined threshold pressure, the valve plug 46 displaces upward against the bias of the release spring 54 and opens, thereby exhausting gas into the atmosphere and reducing the pressure in the regulator 10.

In the conventional regulator 10, the valve port 36 disposed between the inlet 16 and the outlet 18 is a one-piece structure that includes a seat ring 37 and defines an orifice. The sealing insert 29 that is fixed to the body 25 of the valve disc 28 sealingly engages the seat ring 37 of the valve port 36 when the valve disc 28 is in a closed position. The valve port 36 is removable from the regulator valve 104 such that it may be replaced with a different valve port having an orifice and a seat ring of a different diameter or configuration to tailor operational and flow characteristics of the regulator valve 14 to a specific application.

However, once any of the conventional one-piece valve ports are installed, such as the valve port 36, they are fixed and cannot adjust at any angle. As such, the valve disc 28, and more specifically, in this example, the rubber sealing insert 29 disposed within the valve disc 28 must be moved or adjusted and compressed to achieve engagement between the seat ring 37 of the valve port 36 and the valve disc 28. As the insert 29 or related part of the valve disc 28 indents to ensure contact with the seat ring 37 of the valve disc 28, however, the outlet pressure or "lockup value" rises. This can lead to the diaphragm 24 responding to an outlet pressure that is higher than the control pressure, increasing the force required by the valve disc 28 to close the valve 104 or achieve "lockup" or a desired outlet pressure, which may be undesirable.

SUMMARY

In accordance with a first exemplary aspect, a fluid regulating device includes a valve comprising an inlet, an outlet, and a self-aligning valve port disposed between the inlet and the outlet for allowing fluid to flow through the valve, the self-aligning valve port including a retaining portion, a biased portion at least partly disposed within the retaining portion, and a biasing member disposed between the retaining portion and the biased portion. An actuator is coupled to the valve and comprises a control assembly, the control assembly comprising a control element and diaphragm operably connected to the control element, the control element extending into the valve and adapted to be displaced relative to the self-aligning valve port for controlling the flow of fluid between the inlet and the outlet. Upon contact with a portion of the control element, the biased portion automatically moves from a first position in which a longitudinal axis of the biased portion is aligned with a longitudinal axis of the retaining portion to a second position in which the longitudinal axis of the biased portion is disposed at an angle from the longitudinal axis of the retaining portion and alignment and sealing engagement between the biased member and a seating face of the control element occurs.

In accordance with a second exemplary aspect, a self-aligning valve port for use with a fluid regulating device, the fluid regulating device including an inlet, an outlet, wherein the self-aligning valve port is disposed between the inlet and the outlet, and a control assembly having a control member adapted to be displaced relative to the valve portion, thereby controlling the flow of a fluid between the inlet and the outlet, the self-aligning valve port including a retaining portion, a biasing portion at least partly disposed within the retaining portion and including a seat ring, and a biasing member disposed between the retaining portion and the biased portion. After a portion of the control member contacts a portion of the seat ring of the biased portion, the biased portion automatically rotates about an axis perpendicular to a longitudinal axis of the retaining portion until alignment and sealing engagement between a seating face of the control element and a seat ring of the biased portion is achieved.

In accordance with a third exemplary aspect, a method of automatically adjusting a valve port for use with a fluid regulating device, the fluid regulating device including an inlet, an outlet, the self-aligning valve port disposed between the inlet and the outlet, and a control assembly having a control member adapted to be displaced relative to the valve port, thereby controlling the flow of a fluid between the inlet and outlet disposed within a regulator valve, the method comprising providing a retaining portion around a seat ring of a valve port, biasing the seat ring into a first position, wherein a longitudinal axis of the seat ring is aligned or parallel with a longitudinal axis of the retaining portion, and automatically adjusting the seat ring, after a portion of the control member contacts a portion of the seat ring, into a second position about an axis perpendicular to the longitudinal axis of the retaining portion until alignment and sealing engagement between a seating face of the control member and the seat ring of the biased portion is achieved.

In further accordance with any one or more of the foregoing first, second and third aspects, a fluid regulating device and/or a self-aligning valve port and/or method may further include any one or more of the following preferred forms.

In some preferred forms, the biasing member of the fluid regulating device may include at least one of an o-ring, a pair of o-rings, a wave spring, or a compression coil spring. In addition, the self-aligning valve port may further comprise a retention member limiting axial displacement of the biased portion relative to the retaining portion, and the retention member may be disposed near an end of the valve port opposite the biasing member. The retention member may include at least one of retention clip, a retention ring, or a C-clip connected to the biased portion and adapted to abut an end of the retaining portion. In addition, the retention member may be disposed within a circumferential recess of the biased portion to help secure the retaining portion to the biased portion.

In other preferred forms, the biased portion rotates in one of a clockwise or counterclockwise direction relative to the axis perpendicular to the longitudinal axis of the retaining portion and moves in an axial direction along the length of the longitudinal axis of the retaining portion until alignment and sealing engagement between the seating face of the control element and the seat ring of the biased portion is achieved.

In preferred method forms, the method may further comprise limiting axial displacement of the seat ring relative to the retaining portion via a retention member. In addition, biasing the seat ring may comprise biasing the seat ring with a biasing member disposed within a gap between the seat ring and the retaining portion. Further, automatically adjusting the seat ring may comprise rotating the seat ring of the biased portion from the first position in which the longitudinal axis of the biased portion is aligned with the longitudinal axis of the retaining portion to the second position in which the longitudinal axis of the biased portion is disposed at an angle from the longitudinal axis of the retaining portion and alignment and sealing engagement between the biased member and seating face of the control element occurs.

DETAILED DESCRIPTION

Figure 1:
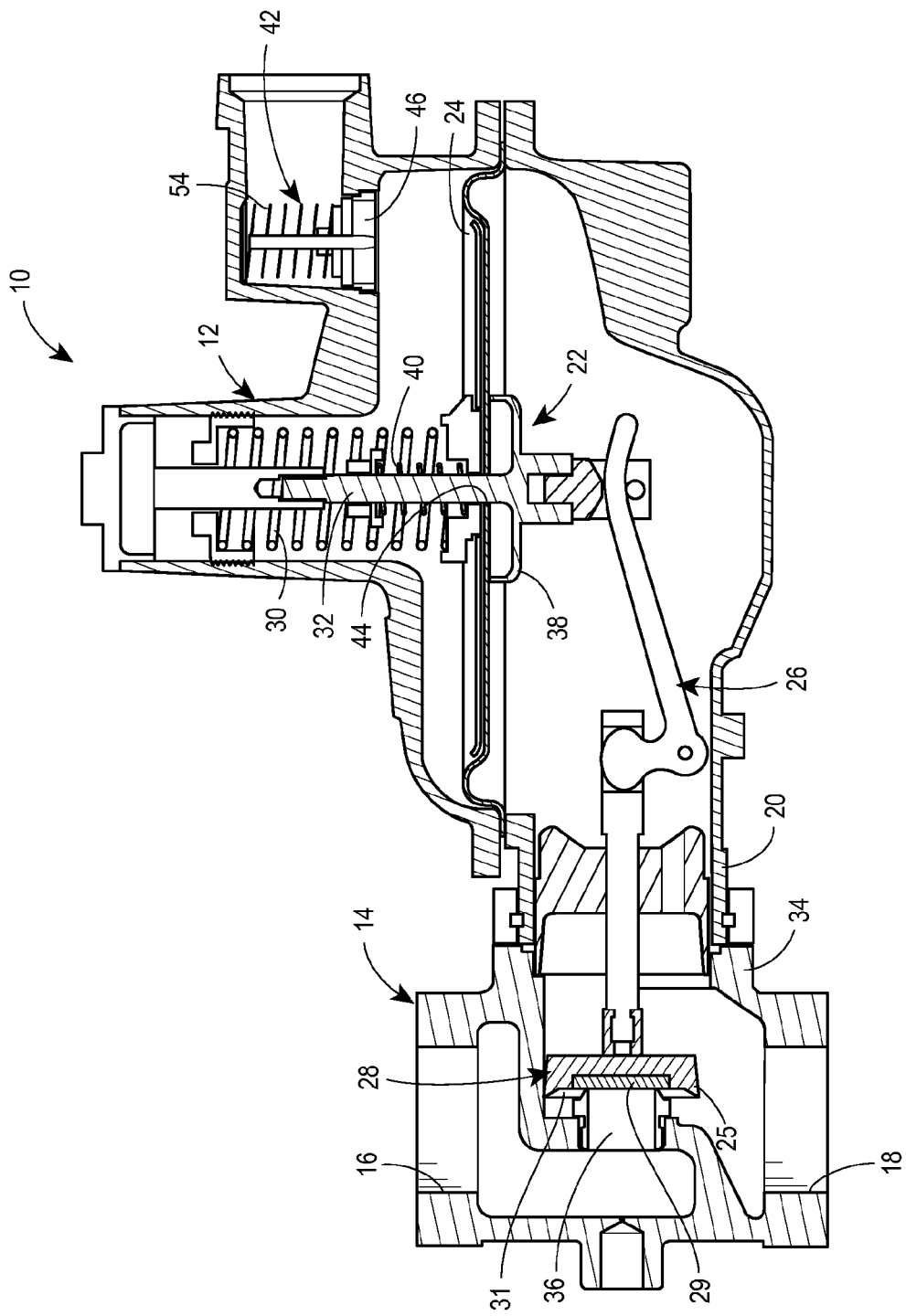
FIG. 1 is a side cross-sectional view of a conventional regulator.
Figure 2:
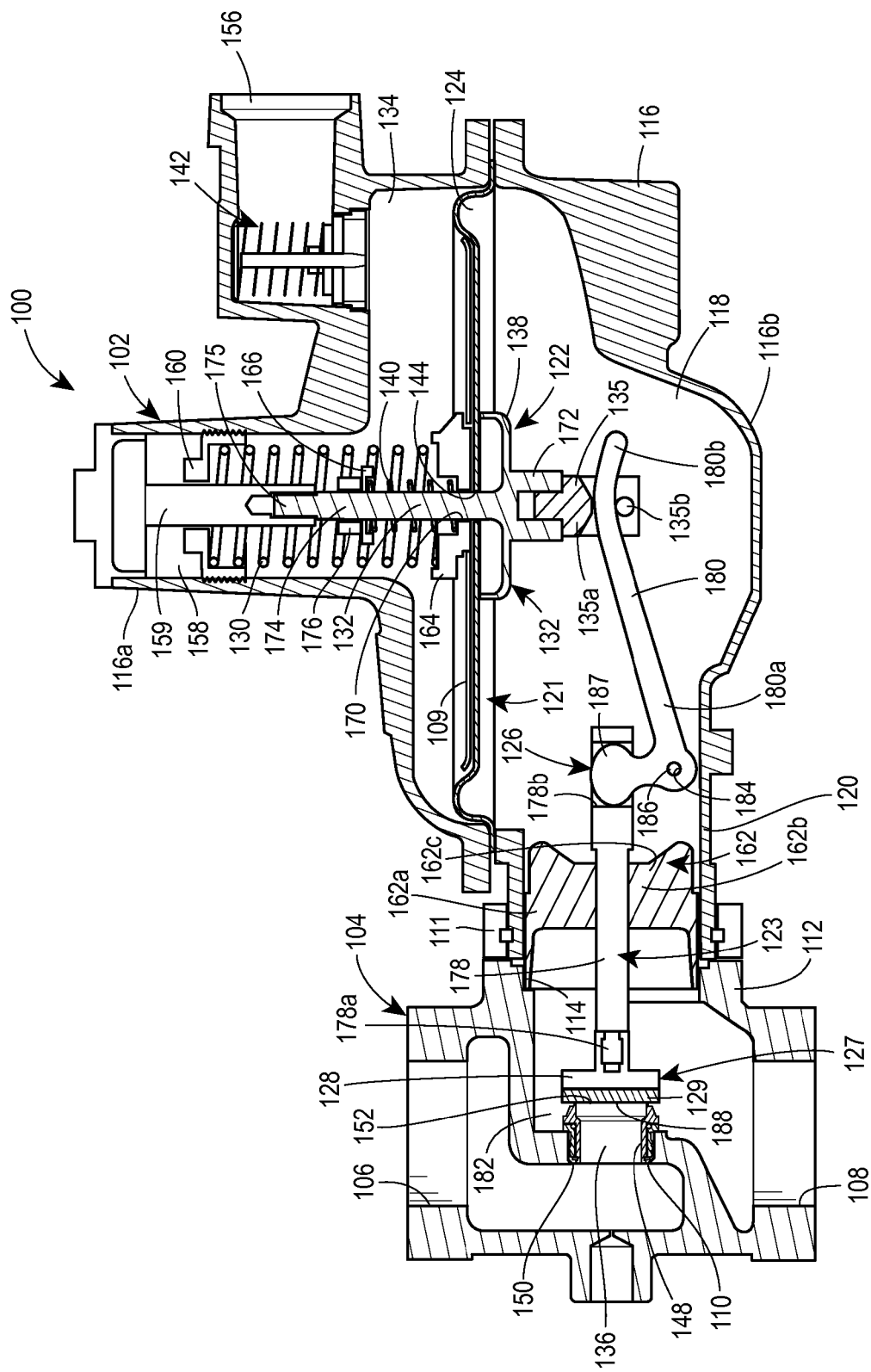
FIG. 2 is a side cross-sectional view of a regulator including a self-aligning valve port, the regulator and the self-aligning valve port being constructed in accordance with one embodiment of the present disclosure.

FIG. 2 depicts a gas regulator 100 including a self-aligning valve port 136, the regulator 100 and the self-aligning valve port 136 are constructed in accordance with one embodiment of the present disclosure. The gas regulator 100 generally comprises an actuator 102 and a regulator valve 104. The regulator valve 104 includes an inlet 106 for receiving gas from a gas distribution system, for example, and an outlet 108 for delivering gas to a facility having one or more appliances, for example. The actuator 102 is coupled to the regulator valve 104 and includes a control assembly 122 having a control element 127. During a first or normal operational mode, the control assembly 122 senses the pressure at the outlet 108 of the regulator valve 104, i.e., the outlet pressure, and controls a position of the control element 127 such that the outlet pressure approximately equals a predetermined control pressure. Additionally, upon the occurrence of a failure in the system, the regulator 100 performs a relief function that is generally similar to the relief function described above with reference to the regulator 10 depicted in FIG. 1.

The regulator valve 104 defines a throat 110 and a valve mouth 112. The throat 110 is disposed between the inlet 106 and the outlet 108. The self-aligning valve port 136 is a two-piece structure, the components of which will be described in more detail below. Generally, the self-aligning valve port 136 is disposed in the throat 110 and defines a bore 148 having an inlet 150 and an outlet 152. As in conventional regulator valves 104, gas must travel through the bore 148 in the valve port 136 to travel between the inlet 106 and the outlet 108 of the regulator valve 104. In the disclosed embodiment, the valve mouth 112 defines an opening 114 disposed along an axis that is generally perpendicular to an axis of the inlet 106 and outlet 108 of the regulator valve 104.

The actuator 102 includes a housing 116 and the control assembly 122, as mentioned above. The housing 116 includes an upper housing component 116a and a lower housing component 116b secured together with a plurality of fasteners, for example. The lower housing component 116b defines a control cavity 118 and an actuator mouth 120. The actuator mouth 120 is connected to the valve mouth 112 of the regulator valve 104 to provide fluid communication between the actuator 102 and the regulator valve 104. In the disclosed embodiment, the regulator 100 includes a collar 111 securing the mouths 112, 120 together. The upper housing component 116a defines a relief cavity 134 and an exhaust port 156. The upper housing component 116a further defines a tower portion 158 for accommodating a portion of the control assembly 122, as will be described.

The control assembly 122 includes a diaphragm subassembly 121, a disc subassembly 123, and a release valve 142. The diaphragm subassembly 121 includes a diaphragm support plate 109, a diaphragm 124, a piston 132, a control spring 130, a relief spring 140, a combination spring seat 164, a relief spring seat 166, a control spring seat 160, and a piston guide 159.

More particularly, the diaphragm 124 includes a disc-shaped diaphragm defining an opening 144 through a central portion thereof. The diaphragm 124 is constructed of a flexible, substantially air-tight, material and its periphery is sealingly secured between the upper and lower housing components 116a, 116b of the housing 116. The diaphragm 124 therefore separates the relief cavity 134 from the control cavity 118.

The combination spring seat 164 is disposed on top of the diaphragm 124 and defines an opening 170 disposed concentric with the opening 144 in the diaphragm 124. As depicted in FIG. 2, the combination spring seat 164 supports the control spring 130 and the relief spring 140.

The piston 132 of the disclosed embodiment includes a generally elongated rod-shaped member having a sealing cup portion 138, a yoke 172, a threaded portion 174, and a guide portion 175. The sealing cup portion 138 is concaved and generally disc-shaped and extends circumferentially about a mid-portion of the piston 132, and is located just below the diaphragm 124. The yoke 172 includes a cavity adapted to accommodate a coupler 135 which connects to a portion of the disc subassembly 123 to enable attachment between the diaphragm subassembly 121 and the disc subassembly 123, as will be described.

The guide portion 175 and the threaded portion 174 of the piston 132 are disposed through the openings 144, 170 in the diaphragm 124 and the combination spring seat 164, respectively. The guide portion 175 of the piston 132 is slidably disposed in a cavity in the piston guide 159, which maintains the axial alignment of the piston 132 relative to the remainder of the control assembly 122. The relief spring 140, the relief spring seat 166, and a nut 176 are disposed on the threaded portion 174 of the piston 132. The nut 176 retains the relief spring 140 between the combination spring seat 164 and the relief spring seat 166. The control spring 130 is disposed on top of the combination spring seat 164, as mentioned, and within the tower portion 158 of the upper housing component 116a. The control spring seat 160 is threaded into the tower portion 158 and compresses the control spring 130 against the combination spring seat 164. In the disclosed embodiment, the control spring 130 and the relief spring 140 include compression coil springs. Accordingly, the control spring 130 is grounded against the upper housing component 116a and applies a downward force to the combination spring seat 164 and the diaphragm 124. The relief spring 140 is grounded against the combination spring seat 164 and applies an upward force to the relief spring seat 166, which in turn is applied to the piston 132. In the disclosed embodiment, the force generated by the control spring 130 is adjustable by adjusting the position of the control spring seat 160 in the tower portion 158, and therefore the control pressure of the regulator 100 is also adjustable.

The control spring 130 acts against the pressure in the control cavity 118, which is sensed by the diaphragm 124. Accordingly, the force applied by the control spring 130 sets the outlet pressure to a desired, or control pressure for the regulator 100. The diaphragm subassembly 121 is operably coupled to the disc subassembly 123, as mentioned above, via the yoke portion 172 of the piston 132 and the coupler 135.

Specifically, the disc subassembly 123 includes a control arm 126 and a stem guide 162. The control arm 126 includes a stem 178, a lever 180, and the control element 127. The control element 127 of the disclosed embodiment includes a valve disc 128. Additionally, in the disclosed embodiment, the valve disc 128 includes a sealing disc 129 for sealing against the valve port 136 as depicted in FIG. 2. The sealing disc 129 may be attached to the remainder of the valve disc 128 with adhesive, for example, or some other means. The sealing disc 129 may be constructed of the same material or a different material than remainder of the valve disc 128. For example, in one embodiment, the sealing disc 129 may include a polymer sealing disc 129.

The stem 178, the lever 180, and the valve disc 128 are constructed separately and assembled to form the control arm 126. Specifically, the stem 178 is a generally linear rod having a nose 178a and a recess 178b, which in the disclosed embodiment is generally rectangular. The lever 180 is a slightly curved rod and includes a fulcrum end 180a and a free end 180b. The fulcrum end 180a includes an aperture 184 receiving a pivot pin 186 carried by the lower housing component 116b. The fulcrum end 180a also includes a knuckle 187 having an elliptical cross-section and disposed within the recess 178b of the stem 178. The free end 180b is received between a top portion 135a and a pin 135b of the coupler 135 that is attached to the yoke 172 of the piston 132. Thus, the coupler 135 operably connects the disc subassembly 123 to the diaphragm subassembly 121.

The stem guide 162 includes a generally cylindrical outer portion 162a, a generally cylindrical inner portion 162b, and a plurality of radial webs 162c connecting the inner and outer portions 162b, 162a. The outer portion 162a of the stem guide 162 is sized and configured to fit within the mouths 112, 120 of the regulator valve 104 and lower housing component 116b, respectively. The inner portion 162b is sized and configured to slidably retain the stem 178 of the control arm 126. Thus, the stem guide 162 serves to maintain the alignment of the regulator valve 104, the actuator housing 116, and the control assembly 122, and more particularly, the stem 178 of the control arm 126 of the control assembly 122.

FIG. 2 depicts the control element 127 in a closed position where the valve disc 128 sealingly engages the valve port 136. So configured, gas does not flow through the valve port 136 and the regulator valve 104 is closed. This configuration is achieved because the outlet pressure, which corresponds to the pressure in the control cavity 118 of the housing 116 and sensed by the diaphragm 124, is greater than the force applied by the control spring 130. Accordingly, the outlet pressure forces the diaphragm 124 and the piston 132 into the closed position.

As previously noted, conventional one-piece valve ports, such as the valve port 36 (FIG. 1), are constructed as one rigid piece and screwed into the body of the regulator valve 104 upon installation and are, therefore, fixed and cannot adjust at any angle. As such, unless the valve disc 28, and, more particularly, a seating face 88 of the rubber sealing insert 29 disposed within the vale disc 28 is perfectly aligned with the seat ring 37 of the conventional valve port 36, a portion of the sealing insert 29 that first contacts the seal ring 37 must be compressed in order to achieve fluid-tight engagement. As the insert 29 or related part of the valve disc 28 compresses it indents and becomes deformed to ensure complete contact with the seat ring 37, which ultimately requires the outlet pressure or "lockup value" to rise. This can lead to the diaphragm 24 needing to respond to an outlet pressure that is higher than the control pressure, in order to increase the force required by the valve disc 28 to close the valve 104, i.e., achieve "lockup."

Accordingly, the self-aligning valve port 136 of the present disclosure is designed such that a portion of the self-aligning valve port 136 is capable of automatically adjusting or moving to achieve alignment and sealing engagement between the valve port 136 and the insert 129 of the valve disc 128 of the control element 127. In other words, the self-aligning valve port 136, and not the control element 127, adjusts to achieve alignment and sealing engagement between a seat ring 159 (FIG. 3) of the valve port 136 and the insert 129 of the control element 127, as explained in more detail below. Because the sealing insert 129 of the control element 127 does not have to adjust (e.g., become deformed) to achieve alignment or sealing engagement, the force required to achieve the desired outlet pressure during extended use of the regulator 100, for example, is maintained constant and regulator performance is improved.

Figure 3:
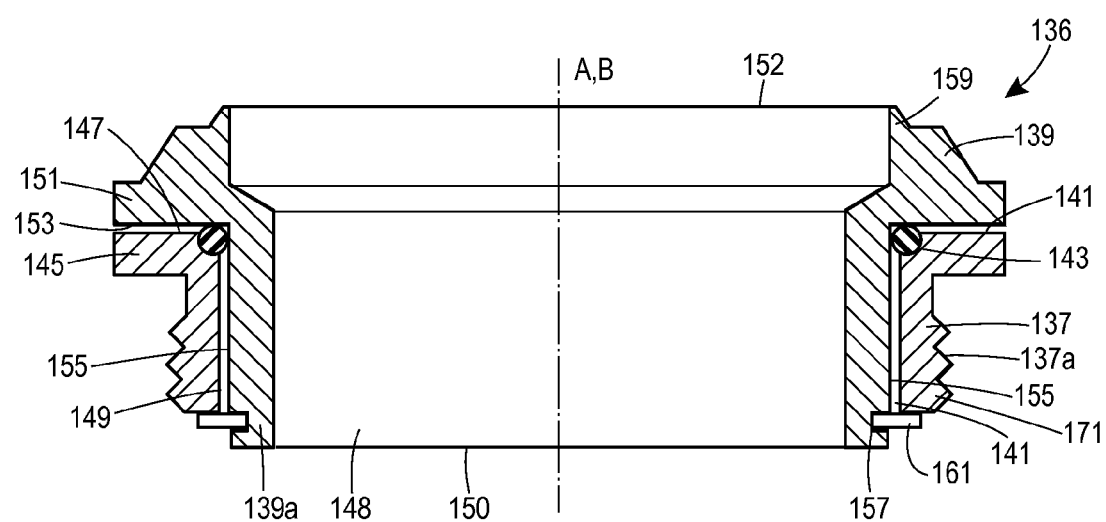
FIG. 3 is a cross-sectional view of the self-aligning valve port of FIG. 2 constructed in accordance with the embodiment of the present disclosure, wherein the self-aligning valve port is in a first position.

To do so, the valve port 136 is so configured such that it includes a two-piece structure having a retaining portion 137 and a biased portion 139, as illustrated in FIG. 3. A section of the biased portion 139 is disposed within the retaining portion 137, and a gap 141 is formed between the retaining portion 137 and the biased portion 139 along the length of the valve port 136. As further illustrated in FIG. 3, a biasing member 143 is disposed in the gap 141 at an end proximate to the outlet 152 to bias the biased portion 139, as explained in more detail below.

The retaining portion 137 includes a cylindrical threaded portion 137a having an inner sidewall 149 and threads 171 that allow the retaining portion 137 to threadably engage or be screwed into the body of the regulator valve 104. As such, the retaining portion 137 of the valve port 136 is fixed and does not move when installed. The retaining portion 137 further includes a flange 145 extending radially outward from the threaded portion 137a and having a top shoulder surface 147.

In a similar manner, the biased portion 139 also includes a cylindrical portion 139a and a flange 151 extending radially outward from the cylindrical portion 139a, such that when the biased portion 139 is disposed within the retaining portion 137 the flange 151 is disposed adjacent to the flange 145 of the retaining portion 137. The flange 151 includes a bottom shoulder surface 153 that is likewise disposed adjacent to the top shoulder surface 147 of the flange 145 of the retaining portion 137. The cylindrical portion 139a of the biased portion 139 further includes an outside wall 155. The gap 141 extends between the inner wall 149 of the retaining portion 137 and the outside wall 155 of the biased portion 139 along the length of the biased portion 139 and continues to extend between the bottom shoulder surface 153 of the flange 151 of the biased portion 139 and the top shoulder surface 147 of the flange 145 of the retaining portion 137, as illustrated in FIG. 3. The biased portion 139 further includes a circumferential recess 157 disposed at an end of the retaining portion 137 proximate to the inlet 150 of the bore 148 and a seat ring 159 disposed at an end of the biased portion 139 proximate the outlet 152 of the bore 148.

Neither the end of the portion proximate to the inlet 150 nor the end of the biased portion 139 proximate to the inlet 150 includes a seating surface or any other surface that contacts any other part of the regulator valve 104 or regulator 100 to seal the valve. In other words, the ends of both the retaining and biased portions 137, 139 disposed proximate to the inlet 150 do not seal against any surface during any operation of the valve 104 or position of the control element 127. The ends of both the retaining and biased portions 137, 139 disposed proximate to the inlet 150 are always "free."

As further illustrated in FIG. 3, a retention member 161 is connected to or disposed within the circumferential recess 157 of the biased portion 139 to secure the retaining portion 137 to the biased portion 139 and is adapted to abut an end portion of the retaining portion 137. The retention member 161 may include a retaining clip, a retention ring, a C-clip or any other member 161 capable of securing the retaining portion 137 to the biased portion 139. In effect, the retention member 161 helps retain the biased portion 139 inside the retaining portion 137. That is, the retention member 161 operates to limit axial displacement of the biased portion 139 relative to the retaining portion 137 in a direction toward the outlet 152 of the bore 148.

So configured, in one version, the biasing member 143 can be slightly compressed by the force of the retention member 161 and the retaining portion 137, such that the biasing member 143 contacts the bottom shoulder surface 153 of the biased portion 139 and generates a force onto the biased portion 139. While the retaining portion 137 is threaded into the body of the valve 104 when the valve port 136 is disposed within the throat 110 of the valve 104 and installed, the biased portion 139 in effect floats within the valve 104. The floating position of the biased portion 139 enables the biased portion 139 to self-adjust or move and/or rotate or pivot upon contact with a portion of the seating face 188 (FIG. 2) of the control element 128 until alignment and sealing engagement with the entire seating face 188 of the control element is achieved.

More specifically, in one example, and as illustrated in FIG. 3, a longitudinal axis A of the retaining portion 137 is parallel to or aligned with a longitudinal axis B of the biased portion 139 of the self-aligning valve port 136. The longitudinal axis A of the retaining portion 137 is typically aligned with the longitudinal axis B of the biased portion 139 upon installation of the valve port 136 within the regulator valve 104, and the biased portion 139 essentially floats within the regulator valve. In other words, FIG. 3 illustrates the biased portion 139 in a first position, wherein the longitudinal axes A and B of the retaining portion 137 and biased portion 139, respectively, are aligned with each other (e.g., coaxially disposed).

Figure 4:
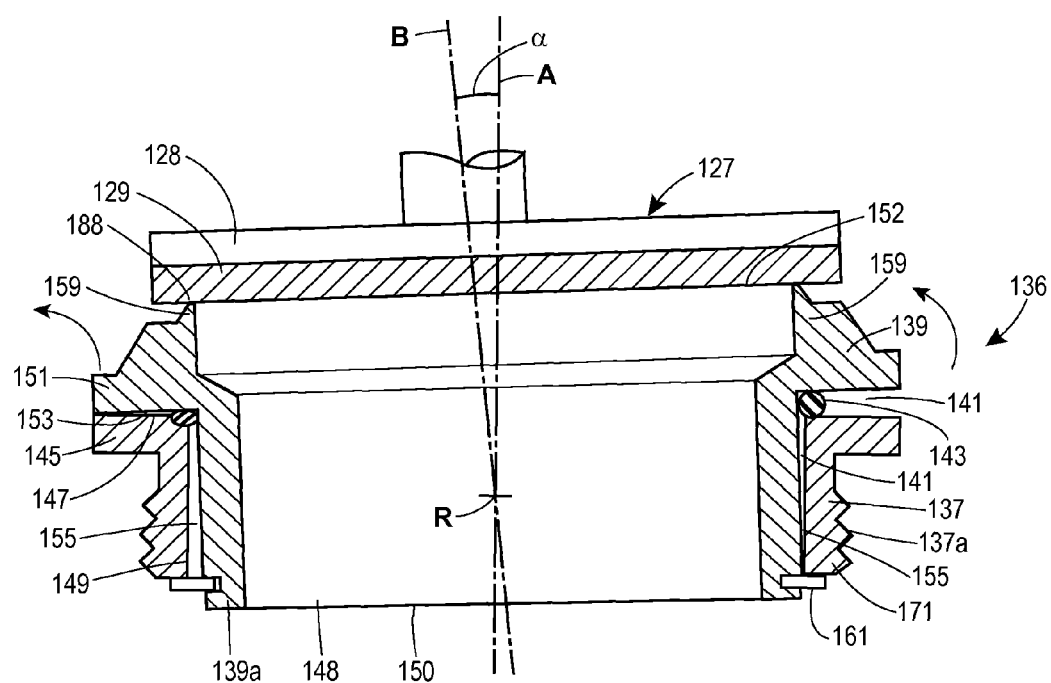
FIG. 4 is another cross-sectional view of the self-aligning valve port of FIG. 2, wherein the self-aligning valve port is in a second position to achieve alignment and sealing engagement with a control element.

Referring now to FIG. 4, a cut-away portion of the control element 127 in a misaligned orientation is illustrated in contact and sealing engagement with the seat ring 159 of the biased portion 139. More specifically, to achieve this engaged position, the seating face 188 of the insert 129 of the control element 127 is initially displaced along the longitudinal axis A of the retaining member 137. Upon initial contact with the seat ring 159 of the biased portion 139 of the valve port 136, the seating face 188 only contacts a portion, in this example a left side, of the seat ring 159 in an effort to close the regulator valve 104, for example. The initial force provided by the seating face 188 of the control element 127 to the left-side portion of the seat ring 159 of the biased portion 139 causes the biased portion 139 to adjust about an axis perpendicular to the longitudinal axis A of the retaining portion 137. In FIG. 3, the axis R can be referred to as the yaw axis of the valve port 136. While in FIG. 3, the yaw axis R extends directly into the page, the yaw axis R is actually defined as any axis that extends perpendicular to the longitudinal axis A of the retaining member 137. Such movement of the biased portion 139 occurs until alignment and sealing engagement between the seating face 188 and the seat ring 159 of the biasing portion 139 occurs.

Said another way, FIG. 3 illustrates the biased portion 139 of the self-aligning valve port 136 in a first position, in which the longitudinal axis A of the retaining portion 137 is aligned with or parallel to the longitudinal axis B of the biased portion 139. FIG. 4, however, illustrates the biased portion 139 of the valve port 136 in a second position, in which the longitudinal axis B of the biased portion 139 is disposed at an angle $\alpha$ relative to the longitudinal axis A of the retaining portion 137, thereby achieving alignment and sealing engagement with the seating face 188 of the control element 127.

More specifically, and as illustrated in FIG. 4, upon contact with a portion of the seating face 188 of the valve element 127, the seat ring 159 of the biased portion 139 rotates about the yaw axis R in a counter-clockwise direction such that a left-side of the bottom shoulder surface 153 of the flange 151 of the biased portion 139 moves toward (and possibly contacts) the top shoulder surface 147 of the flange 145 of the retaining portion 137. Such rotation and movement then increases the size of the gap 141 disposed between a right-side of the bottom shoulder surface 153 of the flange 151 of the biased portion 139 and the top shoulder surface 147 of the flange 145 of the retaining portion. In a similar manner, when the biased portion 139 is rotated in the manner described to achieve a sealing engagement between the seating face 188 and the seat ring 159, the gap 141 disposed between a left-side of the outside wall 155 of the biased portion 139 and the inner wall 149 of the retaining portion 137 increases. In addition, the gap 141 disposed between a right-side of the outside wall 155 of the biased portion 139 and the inner wall 149 of the retaining portion decreases, as illustrated.

Figure 5:
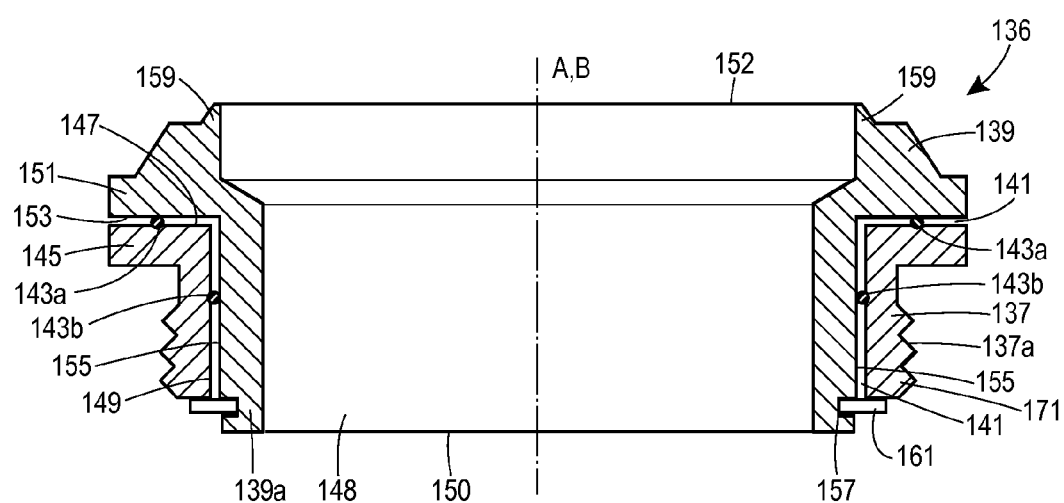
FIG. 5 is a side cross-sectional view of the self-aligning valve port of FIG. 2 having another embodiment of a biasing member constructed in accordance with the embodiment of the present disclosure.

Referring now to FIG. 5, while the biasing member 143 of the self-aligning valve port 136 includes a single o-ring disposed at an intersection of two perpendicular leg portions of the L-shaped gap 141, the biasing member 143 may alternatively include a pair of o-rings, each spaced away from the intersection. More specifically, and as illustrated in FIG. 5, the biasing member 143 could include two o-rings 143a and 143b disposed within the gap 141. The first o-ring 143a is disposed in the gap 141 between the bottom shoulder surface 153 of the flange 151 of the biased portion 139 and the top shoulder surface 147 of the flange 145 of the retaining portion 137. The second o-ring 143b is disposed in the gap 141 between the outside wall 155 of the cylindrical portion 139a of the biased portion 139 and the inner wall 149 of the retaining portion 137.

So configured, in one version, the o-ring 143a can be slightly compressed by the force of the retaining member 161 and the retaining portion 137, such that the o-ring 143a contacts the top shoulder surface 153 of the flange 151 of the biased member 139 and generates a force onto the biased member 139. In addition, the o-ring 143b can also be slightly compressed by the force of the retaining member 161 and the retaining portion 137, such that the biasing member 143b contacts the outside wall 155 of the cylindrical portion 139a of the biased member 139. Like the embodiment depicted in FIGS. 3 and 4, while the retaining portion 137 is threaded into the body of the valve 104 when the valve port 136 is disposed within the throat 110 of the valve 104 and installed, the biased portion 139 illustrated in FIG. 5 also floats within the valve 104. The floating position of the biased portion 139 enables the biased portion 139 to self-adjust or move and/or rotate or pivot upon contact with a portion of the seating face 188 (FIG. 2) of the control element 128 until alignment and sealing engagement with the entire sealing face 188 of the control element 127 is achieved.

More specifically, FIG. 5 illustrates the biased portion 139 of the self-aligning valve port 136 in the first position, in which the longitudinal axis A of the retaining portion 137 is aligned with or parallel to the longitudinal axis B of the biased portion 139. Like the embodiment illustrated in FIG. 4, the biased portion 139 of the valve port 136 of FIG. 5 can also adjust to the second position (FIG. 4), in which the longitudinal axis B of the biased portion 139 is disposed at an angle relative to the longitudinal axis A of the retaining portion 137 to achieve alignment and sealing engagement with the sealing face 188 of the control element 127.

In one example, and like the embodiment of FIG. 4, upon contact with a portion of the seating face 188 of the valve element 127, the seat ring 159 of the biased portion 139 rotates about the yaw axis R (FIG. 4) in a counter-clockwise direction. Such rotation causes the left-side of the bottom shoulder surface 153 of the flange 151 of the biased portion 139 to move toward (and possibly contact) the top shoulder surface 147 of the flange 145 of the retaining portion 137, compressing or further compressing the o-ring 143a disposed therebetween. This rotation and movement can also then increase the size of the gap disposed between the right-side of the bottom shoulder surface 153 of flange 151 of the biased portion 139 and the top shoulder surface 147 of the flange 145 of the retaining portion 137, decreasing the amount of compression to the o-ring 143a on the right-side, for example.

In a similar manner, when the biased portion 139 is rotated in the manner described to achieve a sealing engagement, the gap 141 disposed between a left-side of the outside wall 155 of the biased portion 139 and the inner wall 149 of the retaining portion increases (FIG. 4), reducing the amount of compression of the o-ring 143b disposed therebetween. In addition, the gap 141 disposed between the right-side of the outside wall 155 of the biased portion 139 and the inner wall 149 of the retaining portion decreases, as illustrated in FIG. 4, compressing or further compressing the o-ring 143b disposed therebetween.

While the biasing member 143 of FIGS. 3-5 is either an o-ring or a pair of o-rings, one of skill in the art will appreciate that various other biasing members other than an o-ring or pair of o-rings, such as one or more wave springs, compression coil springs, or any other biasing mechanism, for example, may alternatively be used to achieve the same function of the o-ring(s) and the biasing member 143 in general.

One of skill in the art will further appreciate that such advantages of the self-aligning valve port 136 may also be realized during extended operation of the regulator 100. More specifically, in the event the control element 128 of the control assembly 122 of the actuator 102 is continuously used for an extended period of time and is not changed or replaced, wear to the control element 128 of the control assembly can occur. Such wear results in deformations of and indentations to portions of the seating face 188 of the valve disc 129 of the control element 127, for example. As the seating face 188, for example, indents in this situation, the outlet pressure (lockup value) again rises. The self-aligning valve port 136 of the present disclosure is capable of automatically adjusting to this variation in the control element 128, along with any other variations in assembly and tolerances between the control element 128 and the seat ring 159 of the biased portion 139 of the valve port 136. Thus, the self-aligning valve port 136 effectively reduces the force required to achieve the outlet pressure (lockup), resulting in a more efficient regulator. Moreover, ideally the self-aligning valve port 136 disclosed herein can in some instances avoid such indentations, deformations, etc. that may occur in conventional valve discs.

In light of the foregoing, it should be appreciated that the present invention provides an advantageous means for enabling the valve port 136 to self-adjust upon installation in a regulator valve 104. This advantageously offsets and/or prevents increases in lockup pressure, thereby increasing the efficiency and accuracy at which regulators operate. However, the regulator 100 described herein is merely one example of a fluid control device incorporating the principles of the present disclosure. Other fluid control devices including other regulators and control valves may also benefit from the structures and/or advantages of the present disclosure.

More generally, although certain example apparatus and methods have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A fluid regulating device, comprising:
a valve comprising an inlet, an outlet, and a self-aligning valve port disposed between the inlet and the outlet for allowing fluid to flow through the valve, the self-aligning valve port including a retaining portion, a biased portion at least partly disposed within the retaining portion, and a biasing member disposed between the retaining portion and the biased portion; and
an actuator coupled to the valve and comprising a control assembly, the control assembly comprising a control element and a diaphragm operably connected to the control element, the control element extending into the valve and adapted to be displaced relative to the self-aligning valve port for controlling the flow of a fluid between the inlet and the outlet;
wherein, upon contact with a portion of the control element, the biased portion automatically moves from a first position in which a longitudinal axis of the biased portion is aligned with a longitudinal axis of the retaining portion to a second position in which the longitudinal axis of the biased portion is disposed at an angle from the longitudinal axis of the retaining portion and alignment and sealing engagement between the biased member and seating face of the control element occurs, and
wherein the self-aligning valve port further comprises a retention member limiting axial displacement of the biased portion relative to the retaining portion, the retention member disposed within a circumferential recess of the biased portion to help secure the retaining portion to the biased portion.

2. The device of claim 1, wherein the biasing member comprises at least one of an o-ring, a pair of o-rings, a wave spring, or a compression coil spring.

3. The device of claim 1, wherein the retention member is disposed near an end of the valve port opposite the biasing member.

4. The device of claim 1, wherein the retention member includes at least one of a retention ring, a retention clip or a C-clip connected to the biased portion and adapted to abut an end of the retaining portion.

5. A method of automatically adjusting a valve port for use with a fluid regulating device, the fluid regulating device including an inlet, an outlet, the self-aligning valve port disposed between the inlet and the outlet, and a control assembly having a control member adapted to be displaced relative to the valve port, thereby controlling the flow of a fluid between the inlet and the outlet disposed within a regulator valve, the method comprising:
providing a retaining portion around a seat ring of a valve port;
biasing the seat ring into a first position wherein a longitudinal axis of seat ring is aligned or parallel with a longitudinal axis of the retaining portion,
automatically adjusting the seat ring, after a portion of the control member contacts a portion of the seat ring, into a second position about an axis perpendicular to the longitudinal axis of the retaining portion until alignment and sealing engagement between a seating face of the control member and the seat ring of the biased portion is achieved, and
limiting axial displacement of the seat ring relative to the retaining portion via a retention member disposed within a circumferential recess of the seat ring.

6. The method of claim 5, wherein the retention member comprises one or more of a retaining ring, a retaining clip or a C-clip connected to the biased portion and adapted to abut an end of the retaining portion.

7. The method of claim 5, wherein the retention member is disposed near an end of the valve port opposite the biasing member.

8. The method of claim 5, wherein biasing the seat ring comprises biasing the seat ring with a biasing member disposed within a gap between the seat ring and the retaining portion.

9. The method of claim 7, wherein the biasing member comprises one or more of an o-ring, a pair of o-rings, a wave spring or a compression coil spring.

10. The method of claim 5, wherein automatically adjusting the seat ring comprises rotating the seat ring of the biased portion from the first position in which the longitudinal axis of the biased portion is aligned with the longitudinal axis of the retaining portion to the second position in which the longitudinal axis of the biased portion is disposed at an angle from the longitudinal axis of the retaining portion and alignment and sealing engagement between the biased member and seating face of the control element occurs.

11. A self-aligning valve port for use with a fluid regulating device, the fluid regulating device including an inlet, an outlet, wherein the self-aligning valve port is disposed between the inlet and the outlet, and a control assembly having a control member adapted to be displaced relative to the valve port, thereby controlling the flow of a fluid between the inlet and the outlet, the self-aligning valve port comprising:
a retaining portion;
a biased portion at least partly disposed within the retaining portion and including a seat ring;
a biasing member disposed between the retaining portion and the biased portion; and
a retention member limiting axial displacement of the biased portion relative to the retaining portion, the retention member including at least one of a retention ring, a retention clip or a C-clip connected to the biased portion and adapted to abut an end of the retaining portion;

wherein, after a portion of the control member contacts a portion of the seat ring of the biased portion, the biased portion automatically rotates about an axis perpendicular to a longitudinal axis of the retaining portion until alignment and sealing engagement between a seating face of the control element and the seat ring of the biased portion is achieved, and wherein the biased portion includes a circumferential recess for receiving the retention member.

12. The self-aligning valve port of claim 11, wherein the biasing member comprises at least one of an o-ring, a pair of o-rings, a wave spring or a compression coil spring.

13. The self-aligning valve port of claim 11, wherein the biased portion rotates in one of a clockwise or counterclockwise direction relative to the axis perpendicular to the longitudinal axis of the retaining portion and moves in an axial direction along the length of the longitudinal axis of the retaining portion until alignment and sealing engagement between the seating face of the control element and the seat ring of the biased portion is achieved.

14. The self-aligning valve port of claim 11, wherein, upon contact with a portion of the control element, the biased portion automatically moves from a first position in which a longitudinal axis of the biased portion is aligned with the longitudinal axis of the retaining portion to a second position in which the longitudinal axis of the biased portion is disposed at an angle from the longitudinal axis of the retaining portion and alignment and sealing engagement between the biased member and seating face of the control element occurs.

* * * * *